UNITED STATES PATENT OFFICE.

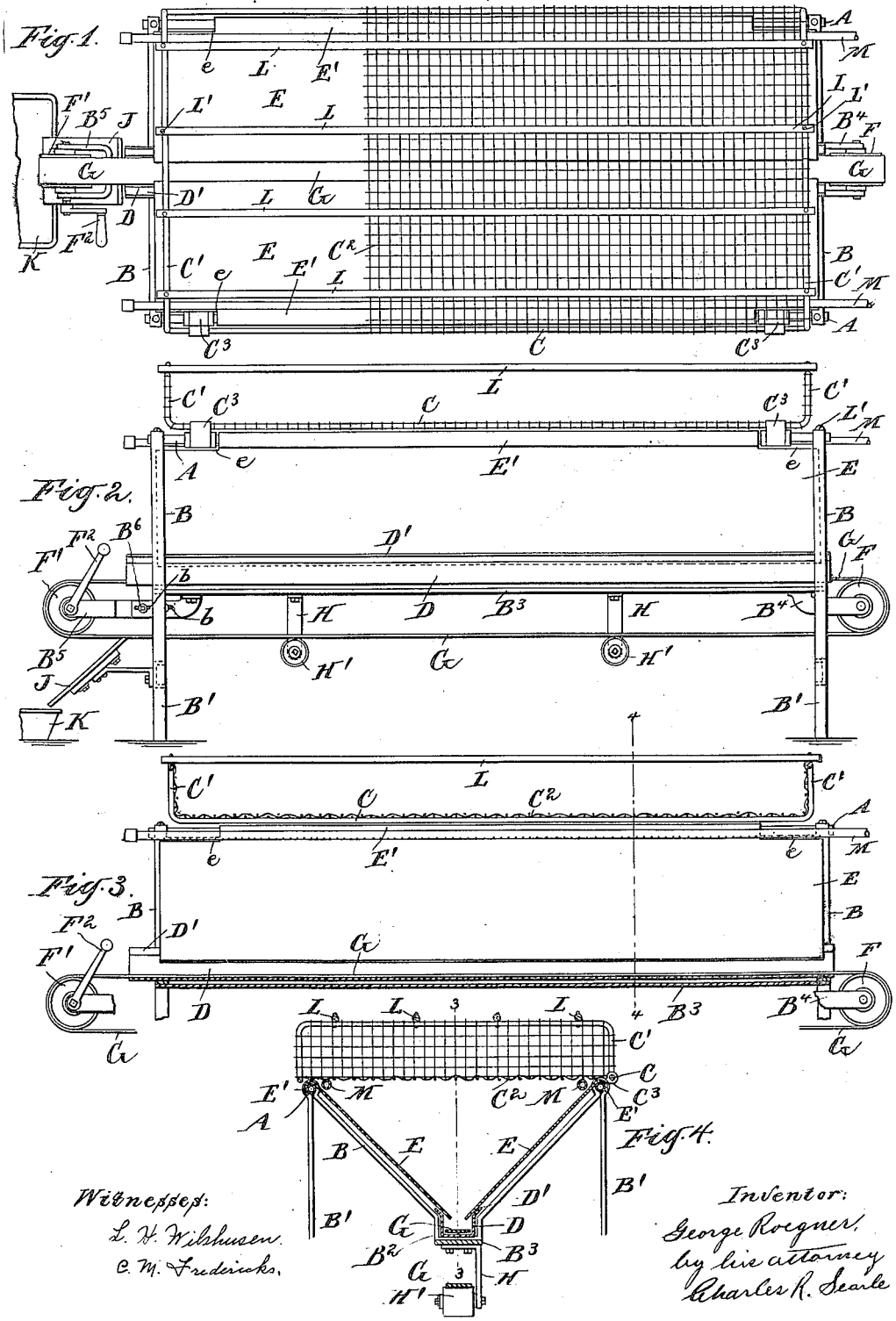

GEORGE ROEGNER, OF PASSAIC, NEW JERSEY.

POULTRY-ROOST.

1,125,597.　　　　Specification of Letters Patent.　　Patented Jan. 19, 1915.

Application filed April 11, 1914. Serial No. 831,107.

*To all whom it may concern:*

Be it known that I, GEORGE ROEGNER, a citizen of the United States, residing at Passaic, in the county of Passaic and State of New Jersey, have invented a certain new and useful Improvement in Poultry-Roosts, of which the following is a specification.

It is well understood by poultry raisers that the accumulation of manure in the chicken-house, even for short periods, is the source of many of the ills to which domestic fowls are liable and is especially the case in respect to chickens. The floor immediately below the roosts is most likely to become contaminated with disease germs from this source.

The object of this invention is to provide a roosting place in which the excreta will fall into a receptacle not accessible to the chickens, and from which it may be easily and quickly removed.

Another important object is to provide a construction in which all portions of the roost may be readily and economically cleaned.

The invention consists in certain novel features of arrangement and details of construction by which the above objects are attained, to be hereinafter described and claimed.

The accompanying drawings form a part of this specification and show an approved form of the invention.

Figure 1 is a plan view of the improved roost. Fig. 2 is a corresponding side elevation. Fig. 3 is a central vertical longitudinal section, partly in elevation, the plane of section being indicated by the line 3—3 in the succeeding figure. Fig. 4 is a vertical transverse section, partly in end view, the plane of section being indicated by the line 4—4 in Fig. 3.

Similar letters of reference indicate the same parts in all the figures.

A A are horizontally extending side-rods or tubes, supported in end-frames or standards B B having legs $B^1$ $B^1$ resting upon the floor of the chicken-house. On one of the rods is hinged a platform consisting of a frame C of rods or small tubing, rectangular in plan view and turned up at the ends $C^1$ $C^1$. This frame is covered with a horizontally disposed screen $C^2$ of small wire of large mesh, (one inch mesh is found to be suitable) extending vertically at the ends $C^1$ $C^1$, as shown.

Beneath the platform and at about the mid-height of the structure is a narrow trough D having flared sides or flanges $D^1$ within which rest the free lower edges of a pair of leaves E E extending angularly downward from the rods A A into the trough. The upper margins of the leaves are curled outwardly to form flanges of hook-section, as at $E^1$ $E^1$, by which they are removably held to the rods, and each is cut away or notched at the ends, as at $e$, to provide space for the hinges $C^3$ $C^3$ of the platform, and permit the leaves to be used interchangeably on both rods A A. The trough D is removably supported in the end frames or standards B B in a pocket $B^2$ formed in each, and the pockets are joined by a strip or brace $B^3$ extending longitudinally from one to the other beneath the trough D. Attached to the brace $B^3$ at one end, is a centrally located bracket $B^4$ carrying a pulley F mounted on a short transverse shaft in suitable bearings therein, and at the opposite end of the brace is a bracket $B^5$ carrying a similar pulley $F^1$.

On the pulleys is an endless belt or apron G traversing the inner surface of the trough D below the overhanging edges of the leaves E E and returning beneath the brace $B^3$.

The bracket $B^5$ is preferably longer than the bracket $B^4$ and is in two parts, joined by bolts $B^6$ received in slots $b$ $b$ in one portion, to provide a measure of adjustability and permit the apron to be tightened. The latter is supported beneath the brace $B^3$ by hangers H H secured thereto and carrying idle carrier-rollers $H^1$ $H^1$.

On the shaft of the pulley $F^1$ is a crank $F^2$ by which the pulley may be revolved and the upper member of the apron G caused to move lengthwise along the bottom of the trough.

Extending longitudinally above the platform are the perches L L secured upon the upturned ends of the frame C, and preferably held thereto by screws $L^1$ or other detachable means by which the perches are firmly held but may be easily removed for cleaning and disinfection. Droppings from the perches pass through the platform without lodging thereon and fall upon the inclined inner faces of the leaves E E whence they are deflected to the narrow opening between the edges of the leaves and are deposited upon the apron G within the trough D. By turning the crank $F^2$ the apron is moved and the excreta carried to the pulley F¹ where it falls by gravity into any suitable receptacle K provided for the purpose. To insure removal from the apron an inclined scraper J is adjustably mounted in contact with the lower member of the apron in rear of the pulley F¹ and leads any material thus removed to the receptacle K.

M M are pipes, preferably removably mounted, extending longitudinally along the upper margins of the leaves E E immediately beneath the platform, and perforated on the lower faces to permit water to be discharged upon the leaves to clean them when necessary.

It will be noted that the screen or platform C² is hinged to one of the rods A so that it may be turned up and both faces thus conveniently presented for cleansing, and that the leaves E E may be unhooked and withdrawn for cleaning, and permitting access to the apron G and trough D, and that the latter is preferably removably mounted in the pockets B² from which it may be removed by slacking the apron G sufficiently to permit its disengagement.

The apron is preferably of rubber or analogous non-absorbent, easily cleansed material, and all the other portions are preferably of metal, although other materials may be substituted for some of the parts.

The pulley F¹ may be mounted independently of the frame B and at any desired distance therefrom, and the apron G correspondingly lengthened to deposit the material at any point, either within the chicken-house or exterior thereto.

The screen or platform C² may be of any suitable open construction adapted to permit the excreta to fall freely therethrough, and to offer a foothold for the fowls in reaching the perches without danger of entering the leaves or trough.

I claim:—

1. A roost for poultry, comprising an elevated openwork platform, perches above said platform, and means beneath said platform for receiving and removing material dropped through said platform.

2. A roost for poultry, comprising an elevated openwork platform, perches above said platform, a receptacle beneath said platform, and inclined leaves adapted to receive material dropped through said platform and deliver such material to said receptacle.

3. A roost for poultry comprising an elevated openwork platform, perches above said platform, a trough beneath said platform, and inclined leaves adapted to receive material dropped through said platform and deliver such material to said trough.

4. A roost for poultry, comprising an elevated openwork platform, perches above said platform, an endless apron beneath said platform, adapted to receive material dropped through said platform, and means for moving said apron.

5. A roost for poultry, comprising an elevated openwork platform, perches above said platform, an endless apron beneath said platform, inclined leaves beneath said platform adapted to receive material dropped through said platform, and deposit it upon said apron, and means for moving the latter.

6. A roost for poultry, comprising an elevated openwork platform, perches above said platform, a trough beneath said platform, an endless apron having its upper member supported in said trough, inclined leaves adapted to receive material dropped through said platform and deposit it upon said apron within said trough, and means for moving said apron.

7. A roost for poultry, comprising an elevated openwork platform, perches above said platform, a trough beneath said platform, an endless apron having its upper member supported in said trough, inclined leaves adapted to receive material dropped through said platform and deposit it upon said apron in said trough, means for moving said apron, and scraping means acting upon the lower member of said apron.

8. A roost for poultry, comprising an elevated openwork platform, perches above said platform, a trough beneath said platform, inclined leaves adapted to receive material dropped through said platform and deliver it to said trough, and pipes beneath said platform arranged to deliver water upon said leaves.

9. In a poultry roost, a frame comprising standards and connecting side-rods, an openwork platform hinged to one of said rods and having upturned ends, perches supported by such ends, a trough removably supported in said standards beneath said platform, inclined leaves removably connected to said rods and extending into said trough, and means for removing from the latter material dropped through said platform upon said leaves and deposited in said trough.

10. In a poultry roost, a frame comprising standards and connecting side-rods, an openwork platform hinged to one of said rods, perches supported by said platform above the latter, a trough supported beneath said platform, inclined leaves removably connected to said rods and extending into said trough, a pulley at each end of said frame, an endless apron on said pulleys with its upper member received in said trough, and means for moving such member longitudinally of said trough.

11. In a poultry roost, a frame comprising standards and connecting side-rods, an openwork platform hinged to one of said rods, perches supported by said platform above the latter, a trough beneath said platform, inclined leaves removably connected to said rods and extending into said trough, a pulley at each end of said frame, an endless apron on said pulleys with its upper member received in said trough, means for moving such member longitudinally of said trough, and a scraper acting upon the lower member of said apron.

12. In a poultry roost, a frame comprising standards and connecting side-rods, an openwork platform hinged to one of said rods, perches above said platform, a trough beneath said platform, inclined leaves removably connected to said rods and extending into said trough, a pulley at each end of said frame, an endless apron on said pulleys with its upper member received in said trough, means for moving such member longitudinally of said trough, and pipes beneath said platform and arranged to deliver water upon the inner faces of said leaves.

13. In a poultry roost, an elevated openwork platform, perches disposed above said platform, inclined leaves disposed beneath said platform, and means disposed beneath the platform to deliver water upon said leaves.

14. In a poultry roost, an elevated openwork platform, perches disposed above said platform, inclined leaves disposed beneath said platform, means disposed beneath the platform to deliver water upon said leaves, and means for receiving and removing the material dropped through the platform upon the leaves.

15. In a poultry roost, an elevated open platform, perches supported above said platform, a trough beneath the platform, inclined leaves extending into said trough, an endless carrier movable in said trough and means for moving said carrier.

16. In a poultry roost, an elevated open platform, perches supported above said platform, a trough beneath the platform, inclined leaves extending into said trough, an endless carrier movable in said trough, means for moving said carrier, and means for delivering water upon the upper faces of said leaves.

17. In a poultry roost, a frame, a movably mounted openwork platform, perches above said platform, a trough beneath the platform, inclined leaves supported beneath the platform and extending into the trough and means for delivering water upon the inner faces of said leaves.

In testimony that I claim the invention above set forth I affix my signature, in presence of two witnesses.

GEORGE ROEGNER.

Witnesses:
CHARLES R. SEARLE,
HELEN V. RICE.